Sept. 5, 1939.　　　　J. MIHALYI　　　　2,172,340

FOCUSING CAMERA

Filed June 29, 1938

Joseph Mihalyi
INVENTOR

BY Newton M. Perrins
 Donald H. Stewart
ATTORNEYS

Patented Sept. 5, 1939

2,172,340

UNITED STATES PATENT OFFICE 2,172,340

FOCUSING CAMERA

Joseph Mihalyi, Rochester, N. Y., assignor to Eastman Kodak Company, Rochester, N. Y., a corporation of New Jersey Application June 29, 1938, Serial No. 216,541

2 Claims. (Cl. 95—45)

This invention relates to photography, and more particularly to photographic cameras.

One object of my invention is to provide a focusing camera with a mechanism which can be readily operated from the camera body. Another object of my invention is to provide a focusing camera with a scale conveniently arranged so that the focal setting of the camera can be readily determined at any time. Another object of my invention is to provide a novel type of tongue and groove construction on complemental members, moving one in the other, and to provide a suitable space for a focusing scale. Another object of my invention is to provide a camera having a spirally arranged focusing scale, the graduations of which are adapted to come opposite an indicator on the camera body to indicate the focal adjustment of the camera. Still another object of my invention is to provide a focusing scale spirally arranged on a movable member which is adapted to cooperate with a notch or window carried by the camera so that at least most of the graduations on the scale will be concealed when the camera is set for the various focal distances and so that the particular character indicating the focal setting will be readily visible. Other objects will appear from the following specification, the novel features being particularly pointed out in the claims at the end thereof.

Coming now to the drawing wherein like reference characters denote like parts throughout:

Figure 1:
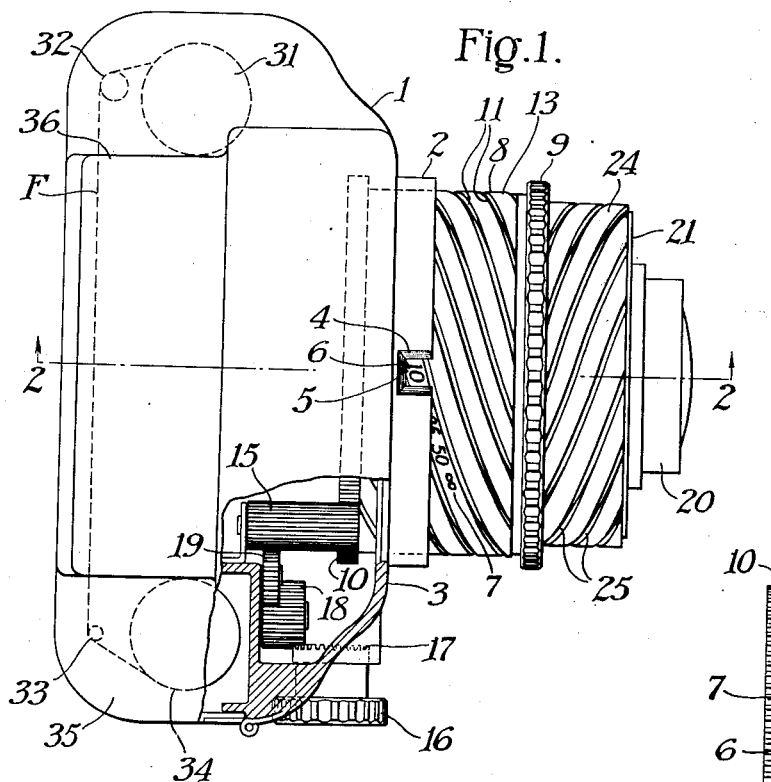
Fig. 1 is a top plan view of a camera having a focusing mechanism constructed in accordance with and embodying a preferred form of my invention, a part of the camera body being broken away to show the focusing gearing.

In cameras of the type having a cylindrical member which both rotates and turns during the focusing movement of the camera objective, it is difficult to provide a focusing scale which is clearly legible and one of the objects of my present invention is to provide such a scale. In the present instance, in carrying out my invention the camera may consist of a camera body member 1 having an annular member 2, fixedly mounted or forming a part of the front wall 3 of the camera. This flange is preferably notched at 4, the base of the notch being provided with a pointer 5, here shown in the form of a scribed line so that any one of the characters 6 on the focusing scale 7 may appear in the notch to indicate the focal setting of the camera.

Figure 3:
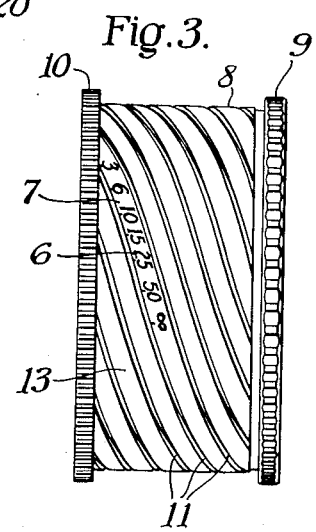
Fig. 3 is a view of the cylindrical member carrying a focusing scale removed from the camera.

As will appear from Fig. 3, the tubular member 8, which carries the focusing scale 7, has a roughened or knurled portion 9 on its outer edge and carries a gear ring 10 on its inner edge. This member is tubular in construction and has a plurality of grooves 11 which form threads adapted to engage complemental-shaped, spirally arranged flanges 12 on the camera body, these flanges being carried on the inside of the flange 2. Thus, members 8 and 2 may telescope as the knurled ring 9 is turned to engage the flanges 11 and 12.

It will be noticed from Fig. 3 that the grooves 11 are spaced apart, leaving smooth cylindrical surfaces 13 between the grooves. I have spaced these grooves apart so that there is sufficient room to provide clearly legible characters 6 indicating the various focal settings of the camera. Consequently, the focusing scale is spirally arranged in a similar manner to the grooves 11.

In order to move the cylindrical member 8 for focusing the camera objective, the gear 10 is arranged so that it may move axially of a gear 15, which gear is one of a series of gears connecting the gear 10 to a focusing knob 16. In the present instance, the focusing knob 16 carries a gear 17 meshing with gear 18 so that still another gear 19 may connect gear 15 with the focusing knob.

As is obvious from Fig. 1, when the knob 16 is turned, the gear 15 will be turned and the camera may be focused as the gear 10 slides axially of the gear 15, this movement, of course, turning the gear 10 and causing the member 8 to move in or out because of the interengaging spiral grooves 11 and spiral flanges 12.

Figure 2:
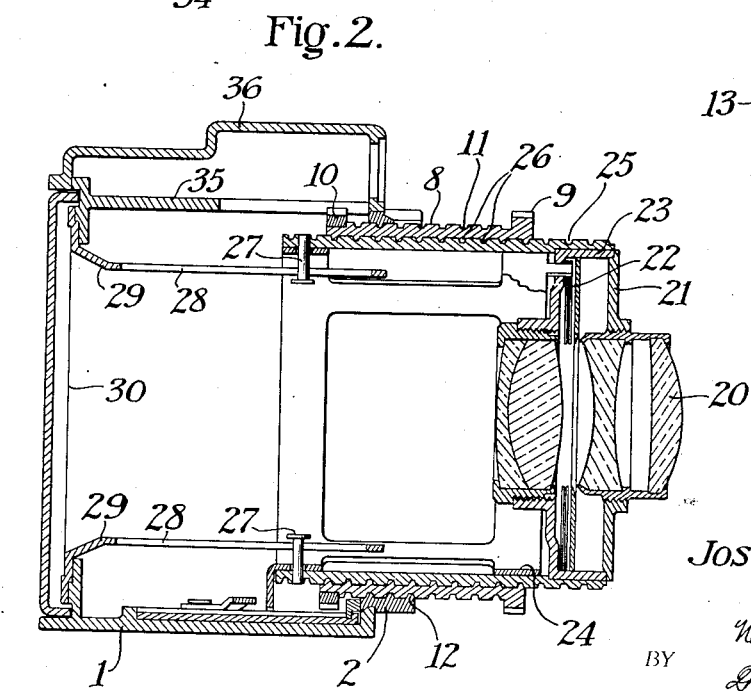
Fig. 2 is a section on line 2—2 of Fig. 1 showing the camera focusing mechanism but omitting some of the other camera parts which form no part of the present invention.

The camera objective 20 may be carried on a suitable lens board 21, this lens board preferably being the front of a between-the-lens type of shutter 22, schematically shown in section in Fig. 2. The outside or periphery of the shutter 23 is carried by a second tubular member 24, this tubular member also carrying a plurality of spaced grooves 25, these grooves being adapted to engage complemental flanges 26 carried by the inside of member 8. In order to prevent the tubular member 24 from turning as the member 8 turns, a pair of studs 27 are placed on the inside of the tube, these studs extending through suitable slots 28 in bracket members 29 carried by the inside of the camera. Thus, as the tubular member 8 is turned, a back or forth motion may be transmitted to the objective 20 for focusing images upon the focal plane which is defined by the plane 30.

As shown in dotted lines in Fig. 1, the film F may be drawn from a supply spool 31 over a guide roller 32, past the exposure frame 30, over a second guide roller 33 and thence wound up upon a take-up spool 34. This construction may be of any standard type, but is only shown so that the normal film path will be apparent.

If desired, on the top wall 35 of the camera there may be a housing 36 containing a view finder or a view finder and range finder, but since this forms no part of my present invention, such a structure will not be further described.

The operation of the camera shown in Fig. 1 is extremely simple. The focusing knob 16 may be turned in a clockwise direction in order to move the cylindrical member 8 so that the objective 20 will be moved outwardly for focusing. Turning the knob 16 and by watching the notch 4 until the proper graduation of the scale 7 appears opposite the pointer 5, the camera can be focused at the desired focal point. While when focusing is done on a very near distance, such as six feet, a portion of the scale may project beyond the edge of the ring 2, this is not confusing because the particular graduation used lies in the notch 4. Moreover, the flange 2 will obscure a large part of the scale. The focusing may be done either rapidly by turning the knurled edge 9 of the member 8, which will transmit motion to the focusing knob 16, or may be done more slowly by turning the focusing knob 16.

As a matter of practice, it is usually done by giving the knurled member 9 a quick turn of, say, one revolution, to bring the objective out to approximately the right place, and then the finer or more accurate focusing can be done by means of the focusing knob 16.

I claim:

1. In a photographic camera the combination with a camera body, of a support for an objective comprising an internally threaded flange carried by the camera body, an exteriorly threaded tubular member engaged with and movable in the internally threaded flange, the threads of the two members comprising spaced spiral tongues and grooves having smooth cylindrical surfaces between, a spirally arranged distance scale on the exteriorly threaded member on one of the smooth cylindrical surfaces between the spiral grooves, a scribed line on the flange carried by the camera body whereby the focal distance may be adjusted by bringing the desired graduation on the scale opposite to the scribed line by moving the tubular member in its threaded connection with the camera body, a gear carried by the exteriorly threaded tubular member, gearing carried by the camera body for moving the gear and the tubular member, said gearing including an elongated gear to engage the tubular member gear throughout its range of movement whereby said tubular member gear may slide axially on said elongated gear during the focusing movement, a focusing knob revolubly carried by the camera, said gearing including intermeshing gears between the knob and elongated gear for transmitting motion from the latter to the former.

2. In a photographic camera the combination with a camera body, of a support for an objective comprising an internally threaded flange carried by the camera body, an exteriorly threaded tubular member engaged with and movable in the internally threaded flange, the threads of the two members comprising spaced spiral tongues and grooves having smooth cylindrical surfaces between, a spirally arranged distance scale on the exteriorly threaded member on one of the smooth cylindrical surfaces between the spiral grooves, a scribed line on the flange carried by the camera body whereby the focal distance may be adjusted by bringing the desired graduation on the scale opposite to the scribed line by moving the tubular member in its threaded connection with the camera body, a gear carried by the exteriorly threaded tubular member, gearing carried by the camera body for moving the gear and the tubular member, said gearing including an elongated gear to engage the tubular member gear throughout its range of movement whereby said tubular member gear may slide axially on said elongated gear during the focusing movement, a focusing knob revolubly carried by the camera, said gearing including intermeshing gears between the knob and elongated gear for transmitting motion from the latter to the former, an objective, an exteriorly threaded tubular member carrying the objective, means for preventing the last mentioned tubular member from turning, and complementary threads on the two tubular members for transmitting focusing movement to the objective from the focusing knob.

JOSEPH MIHALYI.